US00RE35611E

United States Patent [19]

McComas et al.

[11] E Patent Number: Re. 35,611

[45] Reissued Date of Patent: Sep. 23, 1997

[54] LIQUID JET REMOVAL OF PLASMA SPRAYED AND SINTERED COATINGS

[75] Inventors: Charles C. McComas, Palm City; John W. Appleby, Jr., Palm Beach Gardens; Gerard A. Sileo, Jupiter, all of Fla.; Herbert R. Barringer, Midwest City; Michael J. Patry, Oklahoma City, both of Okla.

[73] Assignee: Waterjet Systems, Inc., Huntsville, Ala.

[21] Appl. No.: 558,342

[22] Filed: Nov. 16, 1995

Related U.S. Patent Documents

Reissue of:

[64] Patent No.: 5,167,721
Issued: Dec. 1, 1992
Appl. No.: 784,625
Filed: Dec. 5, 1991

U.S. Applications:

[63] Continuation of Ser. No. 189,860, Feb. 1, 1994, abandoned, which is a continuation of Ser. No. 441,666, Nov. 27, 1989, abandoned.

[51] Int. Cl.[6] ..... B08B 3/02

[52] U.S. Cl. ..... 134/32; 134/34; 134/38

[58] Field of Search ..... 134/32, 34, 38, 134/22.12, 22.18, 24, 40

[56] References Cited

U.S. PATENT DOCUMENTS

| | | | |
|---|---|---|---|
| 2,653,116 | 9/1953 | Whitcomb et al. | 134/10 |
| 3,413,136 | 11/1968 | Emanuelson et al. | 117/8 |
| 3,460,296 | 8/1969 | Dittmar et al. | 51/320 |
| 4,055,705 | 10/1977 | Stecura et al. | 428/633 |
| 4,285,108 | 8/1981 | Arrigoni | 29/156.8 |
| 4,339,282 | 7/1982 | Lada et al. | 134/3 |
| 4,425,185 | 1/1984 | Fishter et al. | 156/656 |
| 4,508,577 | 4/1985 | Conn et al. | 134/22.12 |
| 4,552,594 | 11/1985 | Van Voskuilen et al. | 134/34 |
| 4,590,026 | 5/1986 | Goto | 264/221 |
| 4,607,792 | 8/1986 | Young, III | 239/101 |
| 4,726,104 | 2/1988 | Foster et al. | 29/156.8 |
| 4,859,249 | 8/1989 | Valentini | 134/24 |

FOREIGN PATENT DOCUMENTS

| | | |
|---|---|---|
| 0145988 | 6/1985 | European Pat. Off. . |
| 0400758 | 12/1990 | European Pat. Off. . |
| 2630667 | 11/1989 | France . |
| 8907917 | 10/1989 | Germany . |
| 1362111 | 7/1974 | United Kingdom . |
| 2042399 | 1/1979 | United Kingdom . |
| 2217234 | 10/1989 | United Kingdom . |

OTHER PUBLICATIONS

Flow Systems, Application Profile: *Coke Oven Door Cleaning*, Sep. 1988, (2 pgs), Flow Systems, Inc.

Flow Systems, Application Profile: *Monument Restoration*, Jul. 1988, (2 pgs), Flow Systems, Inc.

Smirnov N. S, Prostakov M. E., Process of Cleaning the Surfaces of Steel, Publishing House Metallurgy, 1965, pp. 34 & 36.

New Zealand Patent No. 176547 dated Feb. 1977 claims 1–10 and FIGS. 1 and 2 only.

New Zealand Patent No. 173992 dated Mar. 1976 claims 1–20 and FIGS. 1–3 only.

*Primary Examiner*—Jill Warden
*Assistant Examiner*—Saeed Chaudhry

[57] ABSTRACT

Gas turbine engine coatings must often be removed during engine maintenance and repair. The techniques utilized to accomplish this task, machining, chemical stripping, machining followed by chemical stripping, or grit blasting, frequently result in component damage or destruction. Liquid jet erosion can be utilized to remove seals, coatings, or portions thereof without damaging the engine hardware.

23 Claims, 2 Drawing Sheets

LIQUID JET REMOVAL OF PLASMA SPRAYED AND SINTERED COATINGS

Matter enclosed in heavy brackets [ ] appears in the original patent but forms no part of this reissue specification; matter printed in italics indicates the additions made by reissue.

This application is a continuation of Ser. No. *08/189,860, filed Feb. 1, 1994, now abandoned; which is a reissue application of Ser. No. 07/784,625, filed Dec. 5, 1991, now issued as U.S. Pat. No. 5,167,721; which is a continuation application of U.S. Ser. No.* 07/441,666, filed Nov. 27, 1989, now abandoned.

The Government has rights in this invention pursuant to a contract awarded by the Department of the Air Force.

TECHNICAL FIELD

This invention relates to the removal of coating materials *utilizing liquid jet erosion*, and specifically to the removal of abradable, wear resistant, and thermal barrier coating materials which have been applied by either sintering powder or fibers, or by plasma spraying[, utilizing liquid jet erosion].

BACKGROUND ART

Various types *of* coatings and sintered materials are used in numerous applications, such as in gas turbine engines to increase efficiency and/or protect components from heat and wear. Types of materials include thermal barrier coatings, abrasive coatings, abradable seals, and hard facing; hereafter referred to as coatings.

Since excessive blade/case clearances and disc/vane clearances within turbine engines allow the escape of gases which decreases engine efficiency, an abradable seal can be applied to minimize the clearances between the rotating and the stationary components. Thermal barrier coatings can be utilized to provide protection against high temperatures, while abrasive coatings can be used to prevent detrimental rub interactions and hard facing can be used to reduce wear.

Some coatings are applied to plasma or flame spraying; introducing particles (usually powders) into a hot gas stream or flame (respectively) which causes the particles to splat onto the substrate surface where they adhere and build up as a coating. Application of particles (i.e. AB-1) or short wires (i.e. Feltmetal TM) onto a substrate; by pre-sintering or partial sintering and then brazing, can be used to produce abradable coatings comprised of bonded particles, wires, or powders and void spaces; while bond coats can be produced by plasma spraying or vapor deposition. Bond coats are usually used in plasma spray and vapor deposition applications; a bond coat being a layer of metallic composition applied to the substrate before the coating is applied. U.S. Pat. Nos. 3,542,530, 3,676,085, 3,754,903, 3,879,831, 3,928,026, and 4,704,332, (incorporated herein by reference) describe various coatings, while U.S. Pat. Nos. 3,413,136, 4,055,705, and 4,321,311 (incorporated herein by reference) describe application techniques.

A common characteristic of these types of coatings is that the coating strength (cohesive strength) is relatively low; plasma sprayed or partially sintered particles are not well bonded to each other and there is usually porosity present. The strength of the coating is less than that of the substrate.

During engine maintenance, these coatings must frequently be removed; a process difficult to *perform* reliably [perform] and which frequently results in substrate damage. Various techniques have been employed for the removal of coatings: machining, chemical stripping, machining followed by chemical stripping (see for example U.S. Pat. Nos. 4,339,282, and 4,425,185; incorporated herein by reference), and grit blasting. For example, machining followed by chemical stripping requires that the component be held stationary while a machining tool removes the majority of the coating. A chemical solution, usually either a very strong acid or base, in then applied to the coating surface to disintegrate the remaining coating material. This technique requires extreme precision; without proper hardware alignment during machining,damage to the substrate material occurs, while the chemical solution used tends to attack the substrate material. This process is also time consuming and labor intensive. Additionally, the chemical step, can produce hazardous waste. The individual processes of chemical stripping and machining also have the above described problems.

Another commonly used method, abrasive or grit blasting, also often results in damaged or destroyed components. This process consists of projecting abrasive particles in a compressed air stream against the coating. Since this technique requires immediate termination upon substrate exposure to prevent damage, it requires skilled operators.

Liquid jets above 10,000 psi, to the best of our knowledge, have not been utilized in the removal of coatings. Relatively low pressure liquid jets, 2,000 to 3,000 psi, have been applied in areas such as: cleaning applications, nuclear contamination removal, concrete scarifying, and barnacle and hull fouling removal, but not in an inorganic coating removal process.

Accordingly, an objective of this invention is to provide a convenient, cost effective, environmentally safe technique of removing coatings.

DISCLOSURE OF INVENTION

The present invention involves the removal of coatings utilizing a liquid jet erosion process. The liquid jet, while striking the coating at an angle, traverses the region, removing the coating. Depending on the liquid pressure, the liquid stream erodes the abradable seal/thermal barrier with virtually no damage to the bond coat (if present), or can remove both the abradable seal/thermal barrier and bond coat simultaneously without substrate damage.

The invention process can be used to remove plasma sprayed and sintered coatings whose cohesive strength is significantly less than that of the substrate.

The foregoing and other features and advantages of the present invention will become more apparent from the following description and accompanying drawings.

BEST MODE FOR CARRYING OUT THE INVENTION

The removal of coatings using current techniques is a difficult, inexact process. It requires skilled technicians, a substantial amount of time, expensive equipment, and frequently, the component is destroyed.

The removal of the coating, bond coat, or both without damage to the substrate material can be achieved with a liquid jet erosion technique; making it a viable alternative to the prior art.

As previously mentioned, this invention uses a liquid jet erosion process to remove coatings. Critical parameters (see FIG. 1) include the nozzle distance from the coating, and the liquid pressure. Depending on equipment and pressure constraints, the nozzle can be placed up to approximately 6 or even 12 inches from the coating surface, however, lesser distances are preferred, with ¼ to ¾ inch especially preferred.

The angle between the liquid jet and similarly the liquid contact and the coating is a matter of preference. An angle of between 20° to 90° can be used, with an angle of between 30° and 90° preferred, and an angle of about 45° especially preferred (see FIG. 1). The angle, not a critical parameter, causes the liquid to remove the coating fragments from the region where the jet impacts the coating. The direction of rotation effects the fragment location post-removal. It is preferred to rotate the component such that it causes the liquid stream to move toward the smallest angle formed between the liquid stream and the component. Although this is merely a matter of preference, this rotation [directions] *direction*helps to remove the fragments from the interaction zone thereby ensuring that they to do not interfere with the process.

Figure 1:
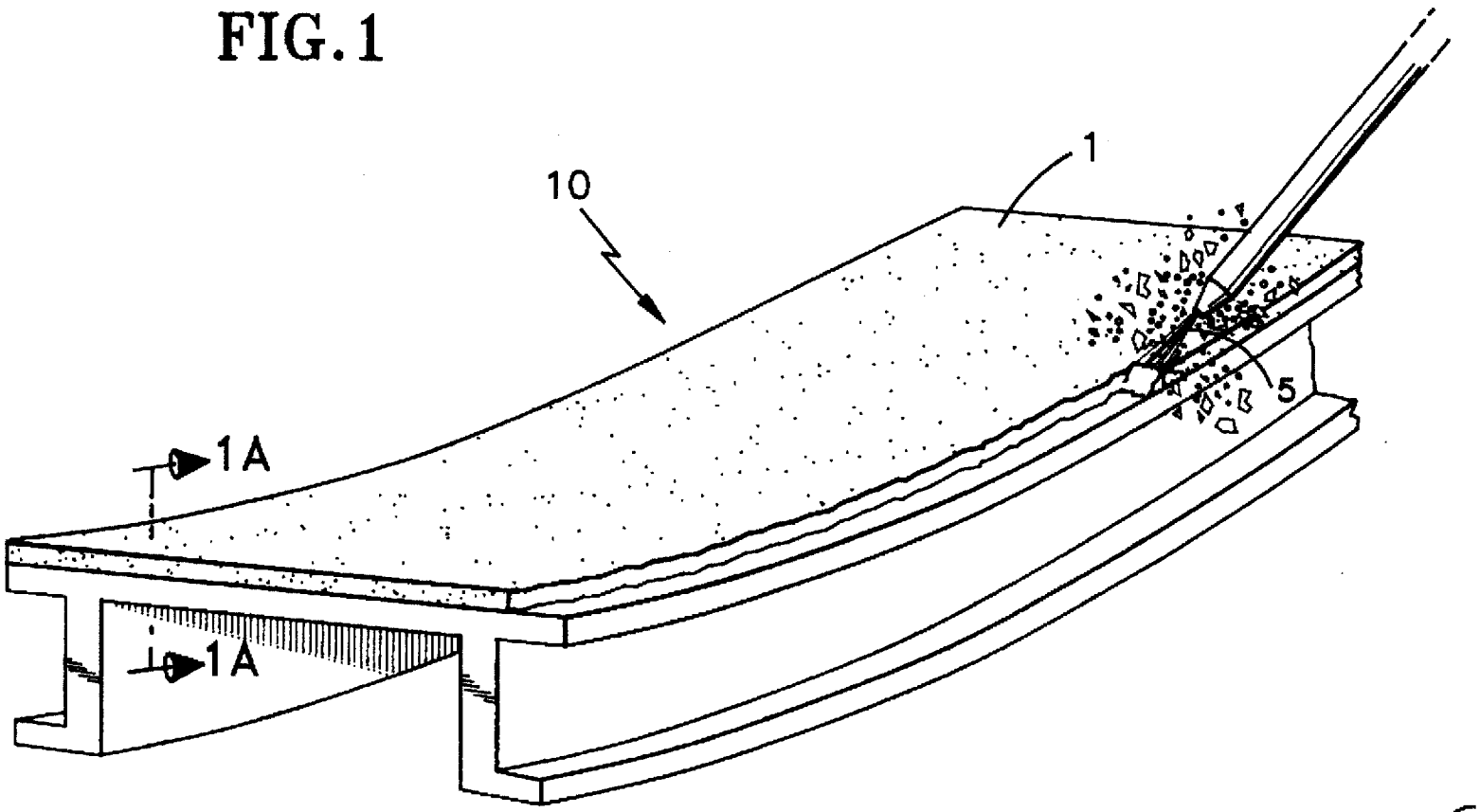
FIG. 1 is a basic embodiment of this invention.

FIG. 1 is one embodiment of the invention. The liquid stream (5) contacts the coating (1) at the preferred angle, approximately 45°. Additionally, the component (10) rotates such that the liquid stream (5) moves toward the smallest angle between the liquid stream (5) and the component (10) (see arrows (1A)).

The liquid stream can consist of any liquid having a viscosity between 0.25 centipoise and 5.00 centipoise at 25° C. and 1 atm and which will not damage the bond coat or substrate material, including water based liquids. Higher viscosity liquids tend to present flow problems with respect to spraying the liquid at high pressures, while lower viscosity liquids can be difficult to pressurize, possibly increasing equipment costs. Water, viscosity approximately 0.95 centipoise at 25° C. and 1 atm, is preferred for reasons of cost and waste disposal. Additives, such as wetting agents, or various chemicals which will degrade the coating without damaging the component, may also be useful.

Figure 1A:
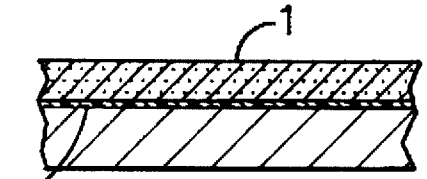
FIG. 1A is a cross-section of FIG. 1 which reveals the various layers of the coating.

A water jet pressure sufficient to remove the top coat and/or the top coat and the bond coat is required. Since pressures greater than about 60,000 psi will damage most gas turbine substrate materials, lower pressures must be used. The optimum liquid pressure ranges from about 20,000 to about 60,000 psi, with about 25,000 to about 40,000 psi preferred. The factors which determine the exact pressure required include the type of top coat and if the coating is to be removed down to the bond coat or to the substrate. (see FIG. 1A; top coat (1) and bond coat (2)). Exact pressure limits are also related to nozzle geometry and spacing, and to the specific substrate involved. In practice, the skilled artisan can readily determine the pressure which causes substrate damage and/or the pressure which causes bond coat removal and reduce this pressure to arrive at a suitable process pressure.

Figure 2:
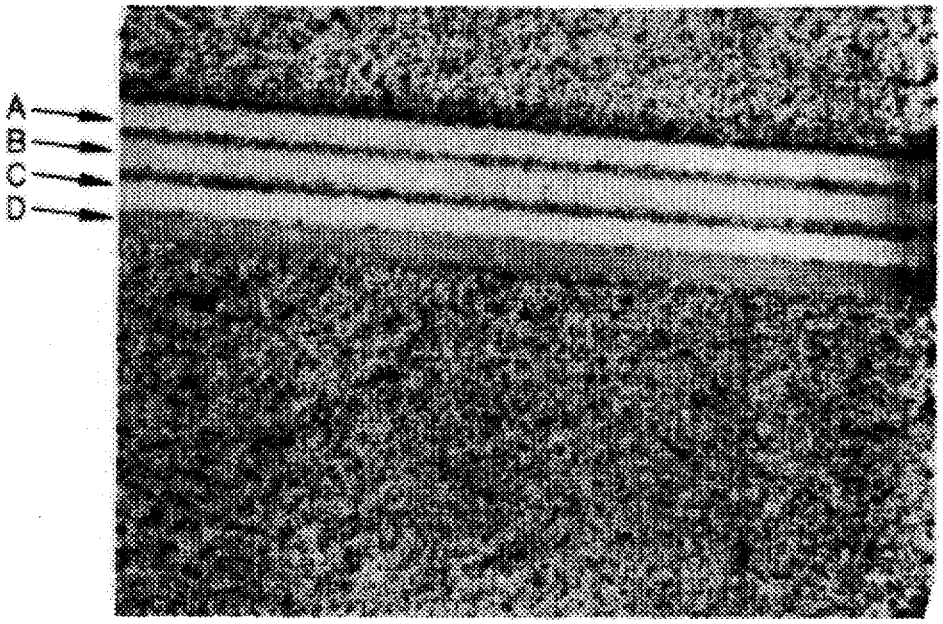
FIG. 2 shows the results of utilizing a liquid jet removal process at varying pressures.

FIG. 2 shows the effects of varying pressures when using this invention. As the pressures decreased, from run (A) to (D), the amount of seal removed also decreases, to the point where the abradable seal/thermal barrier is removed with virtually no damage to the bond coat, (D).

This invention will be made clearer with reference to the following illustrative examples.

EXAMPLE 1

The following procedure is used to remove a plasma sprayed hard face coating, top coat and bond coat, (consisting of 20 v/o of an 80 nickel, 20 chromium alloy, balance chromium carbide) from a substrate material.

1. The coated substrate material is arranged such that relative motion can be produced between it and the water jet nozzle.
2. The water jet nozzle is placed so that the exit end of the nozzle is about ¼ inch from the coating and the water stream contacts the coating at an angle of 45° (refer to FIG. 1).
3. The water pressure is 40,000 psi.
4. Relative motion is created between the water stream and the coating such that as the coating is removed the component advances to the next region to be removed.
5. The removal time is dependant upon the surface area of the coating. The time will range from 5 minutes to 10 minutes for typical gas turbine engine components.

EXAMPLE 2

A sintered abradable coating (consisting of approximately 65 v/o nickel, 35 v/o chrome, balance aluminum) can be removed by following the specifications set forth in Example 1, while substituting a pressure of 35,000 psi for the 40,000 psi in step 4.

This process can be used for any coating which has strength less than that of the substrate, by adjusting the pressure such that it removes the coating without bond coat damage, or the bond coat without substrate damage, allowing reuse of the bond coat and substrate or the substrate respectively.

Although this invention has been shown and described with respect to detailed embodiments thereof, it will be understood by those skilled in the art that various changes in form and detail thereof may be made without departing from the spirit and scope of the claimed invention.

We claim:

1. A method for removing a top coat from a bond [coating] *coat* adhered to a substrate, utilizing a liquid jet, said liquid jet having means for directing the liquid jet, means for creating sufficient pressure to remove the [coating] *top coat*, means to provide the relative motion between the [coating] *top coat* and the liquid jet, and means for supplying the liquid, which comprises:

a. creating sufficient pressure to remove the [coating] *top coat*;

b. providing relative motion between the [coating] *top coat* and the liquid jet;

c. supplying the liquid;

d. causing the liquid to strike the top coat, wherein the liquid striking the top coat causes top coat erosion until the bond coat is exposed;

whereby the bond coat and the substrate suffer essentially no damage and can be reused.

2. A method as in claim 1 wherein the top coat is selected from the group of plasma sprayed, flame sprayed, and sintered coatings.

3. A method as in claim 1 wherein the top coat is an abradable *coating*.

4. A method as in claim 1 wherein the top coat is a thermal barrier *coating*.

5. A method as in claim 1 wherein the top coat is an abrasive *coating*.

6. A method as in claim 1 wherein the [coating] *top coat* is a hard facing *coating*.

7. A method as in claim 1 wherein the liquid pressure is from about 20,000 psi to about 60,000 psi.

8. A method as in claim 1 using a nozzle as the means for directing the liquid flow.

9. A method as in claim 1 wherein the liquid is selected from the group of liquids consisting of all liquid which does not degrade the bond coat, and has a viscosity between about 0.25 centipoise and about 5.00 centipoise at 25° C. and 1 atm.

10. A method as in claim 1 wherein the liquid is selected from the group consisting of water based liquids.

11. A method as in claim 1 wherein the liquid is essentially water.

12. A method as in claim 1 wherein the angle between the liquid stream and the top coat is between 20° and 70°; whereby the angle causes the liquid stream to clean away the [coating] *top coat* fragments.

13. A method [as in claim 1 further comprising the step of removing the bond coating, wherein] *for removing a coating, said coating comprised of at least a top coat and a bond coat adhered to a substrate, which comprises: directing a pressurized liquid jet at a pressure above about 20,000 psi at the coating such that said liquid jet strikes said coating, thereby removing said coating from the substrate, whereby* the substrate [material suffers essentially no damage] *may be reused.*

*14. A method as in claim 13, wherein said top coat and said bond coat are removed simultaneously.*

*15. A method as in claim 13, wherein said liquid jet pressure is between about 20,000 psi and about 60,000 psi.*

*16. A method for removing a protective coating applied to a substrate which comprises: directing a liquid jet at a pressure above approximately 20,000 psi at the protective coating such that the liquid jet strikes the protective coating thereby removing the protective coating from the substrate whereby the substrate may be reused.*

*17. A method as in claim 16, wherein the protective coating is a thermal barrier coating.*

*18. A method as in claim 16, wherein the protective coating is an abrasive coating.*

*19. A method as in claim 16, wherein the protective coating is an abradable seal.*

*20. A method as in claim 16, wherein the protective coating is a hard facing.*

*21. A method as in claim 16, wherein the liquid jet pressure is between about 20,000 psi and about 60,000 psi.*

*22. A method as in claim 16, wherein the protective coating was applied by a pre-sintering and brazing or a partial sintering and brazing process.*

*23. A method as in claim 16, wherein the protective coating was applied by a partial sintering and brazing process.*

* * * * *